(No Model.) 2 Sheets—Sheet 2.

W. A. PATTERSON.
STORAGE CONDENSER AND LINT COTTON CONVEYER.

No. 561,689. Patented June 9, 1896.

Witnesses,
Robert Everett
A. H. Norris

Inventor.
Warren A. Patterson.
By James L. Norris,
Atty.

UNITED STATES PATENT OFFICE.

WARREN A. PATTERSON, OF WACO, TEXAS.

STORAGE-CONDENSER AND LINT-COTTON CONVEYER.

SPECIFICATION forming part of Letters Patent No. 561,689, dated June 9, 1896.

Application filed September 23, 1895. Serial No. 563,386. (No model.)

*To all whom it may concern:*

Be it known that I, WARREN A. PATTERSON, a citizen of the United States, residing at Waco, in the county of McLennan and State of Texas, have invented new and useful Improvements in Storage-Condensers and Lint-Cotton Conveyers, of which the following is a specification.

In the application for patent filed June 13, 1895, Serial No. 552,724, by John S. Tennison, assignor to myself, is described and shown a storage-condenser and lint-cotton conveyer comprising a casing or trunk having air-outlets, lint-cotton inlets, a conveyer arranged within the casing or trunk, and foraminous drums or cylinders arranged in juxtaposition to the air-outlets for the purpose of rapidly disposing of the large body of air introduced in the casing or trunk by the gins, while preventing the escape of the lint-cotton through the air-outlets.

The objects of my invention are to improve the machine above referred to; to avoid the employment of rotary brushes for preventing the accumulation of lint-cotton on the rotating foraminous cylinders or drums; to cause the foraminous cylinders to free themselves from the accumulation of cotton thereupon by rapidly rotating such cylinders or drums and causing the cotton to fly off by centrifugal force; to cause the air within the casing or trunk to escape therefrom through the cylinders or drums and be conducted downward into the casing or trunk at a point below the uppermost horizontal part of the conveyer; to hold back or obstruct the forward movement of the large body of cotton accumulated on the conveyer while the latter remains stationary during the time that a bale is being removed from the baling-press, so that when the conveyer is again started the cotton will be leveled and delivered in a bat of approximately uniform depth of thickness to the pressing-roller, which compresses the bat as it is being delivered to the baling mechanism, and to provide novel means for cleaning and uniformly distributing the lint-cotton on the conveyer as the cotton is moved toward the pressing-roller which compresses the bat and to generally improve and simplify apparatus or machines designed for condensing cotton preparatory to baling the same.

To accomplish all these objects, my invention involves the features of construction, the combination or arrangement of parts, and the principles of operation hereinafter described and claimed, reference being made to the accompanying drawings, in which—

Figure 1:
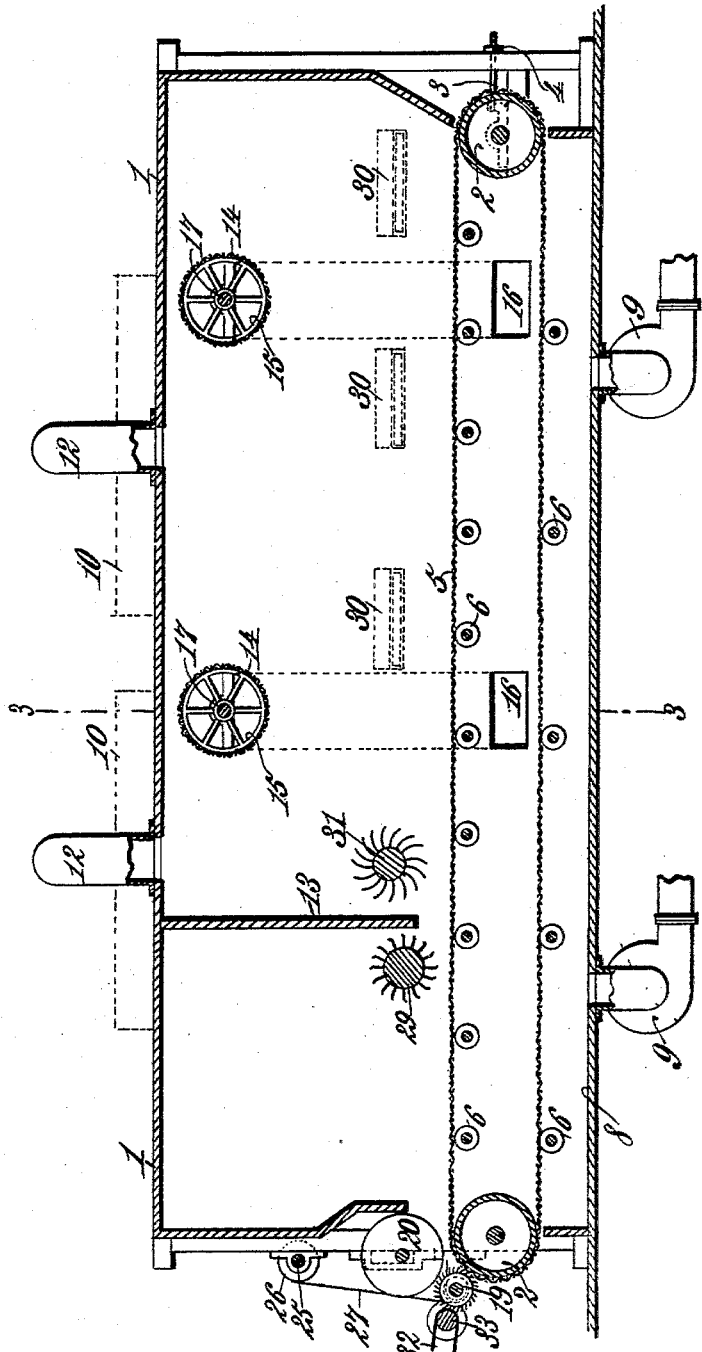
Figure 2:
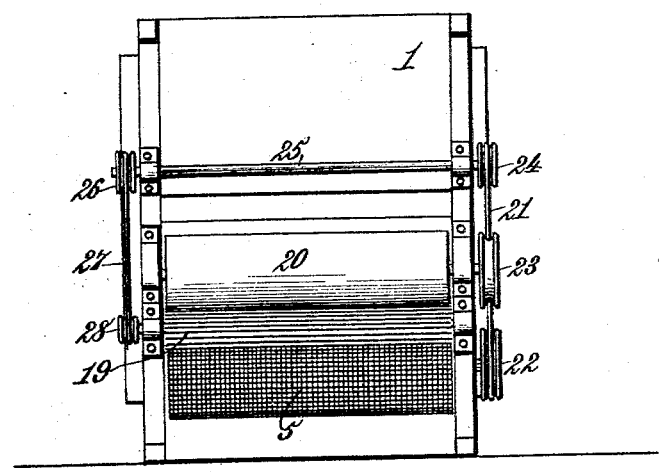
Figure 3:
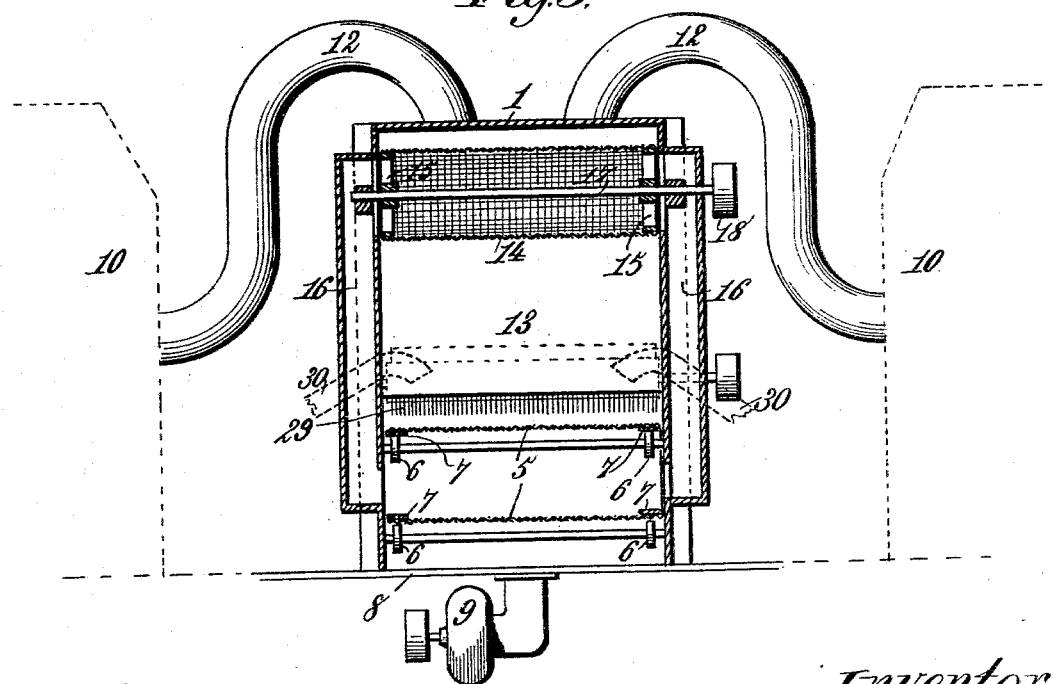

Figure 1 is a longitudinal sectional view taken vertically through a storage-condenser and lint-cotton conveyer constructed in accordance with my invention. Fig. 2 is an end elevation of the same, looking at the pressing-roller and wiper-roller; and Fig. 3 is a vertical sectional view taken on the line 3 3, Fig. 1.

In order to enable those skilled in the art to make and use my invention, I will now describe the same in detail, referring to the drawings, wherein—

The numeral 1 indicates a horizontal casing or trunk, which, as here shown, is rectangular or square in cross-section and which may be of sufficient length to accommodate any desired number of gins constituting a battery or batteries of gins in the plant. The construction or form of the casing or trunk can, however, be widely varied without altering the spirit of my invention. The casing or trunk is provided at or near each end with a drum 2, journaled in suitable bearings, and one of these drums is preferably adjustable horizontally through the medium of a screw-bolt 3 and nut 4 or by any other devices suitable for the purpose.

The foraminous endless belt 5 extends around the drums 2, and the upper and lower stretches of the belt are supported at suitable intervals between the drums by upper and lower sets of supporting-rollers 6. The conveyer-belt may be of a width substantially the same as the width of the casing or trunk on its interior and is composed of wire-cloth or other flexible material having its longitudinal edges provided with reinforcing bands or strips 7, Fig. 3, adapted to travel on the rollers 6. The upper and lower sets of rollers 6 serve to insure a level position of the upper and lower stretches of the endless belt.

The casing or trunk is designed to rest upon a flooring, as at 8, and the interior of the casing or trunk, at the lower portion thereof, is in communication with air-exhaust apparatuses or fans 9, one near each end of the casing, as clearly shown in Fig. 1, so that when the fans are in operation the air within the casing or trunk is uniformly withdrawn therefrom and discharged at any suitable point, either in the building or outside the building in which the condenser and gins are located.

The casing is here shown as arranged between two batteries of gins 10; but if one battery of gins is used the casing will be located immediately in rear of the single battery of gins, as will be obvious.

The gins are shown provided with curved delivery conduits or pipes 12, which introduce the lint-cotton through the top wall of the casing; but I do not wish to be understood as confining myself to any particular arrangement of the cotton-inlet conduits or pipes, as they may be otherwise arranged. For instance, the cotton may be delivered from the gins through openings in the side of the casing, as indicated by the dotted lines 30, Figs. 1 and 3. In other words, the cotton may be delivered into the casing through the top wall thereof or through the sides thereof, according to the conditions required in the construction and arrangement of the plant.

Within the casing is arranged a pendent vertical partition 13, having its lower edge terminating a slight distance (comparatively speaking, about ten inches) from the upper stretch of the endless conveyer-belt 5, and in the upper part of the casing, between the partition and the right-hand end of the casing, are journaled a plurality of rotary foraminous cylinders or drums 14, having skeleton or spider-like heads 15. The opposite ends of each foraminous cylinder or drum are in communication with the upper ends of descending air flues or trunks 16, located, preferably, on the exterior vertical sides of the casing and having their lower ends opening and discharging into the lower portion of the casing at a point between the upper and lower stretches of the endless conveyer in such a manner that the air flowing from the opposite ends of the foraminous cylinders or drums will descend through the vertical air flues or trunks, enter the casing between the upper and lower stretches of the endless conveyer-belts, and be withdrawn from the casing through the medium of the air-exhaust apparatuses or fans 9.

The shaft 17 of the foraminous cylinders or drums 14 are each provided with a pulley 18, Fig. 3, or other suitable device by which rapid rotary motion can be imparted to the cylinders or drums by any driving mechanism suitable for the purpose in hand.

I do not deem it necessary to illustrate the driving mechanism for rapidly revolving the foraminous drums, as such mechanism may be of any construction ordinarily employed to rotate an object at high speed.

One of the belt-supporting drums 2 is designed to be rotated by suitable mechanism for the purpose of imparting a horizontally-traveling motion to the foraminous endless belt.

The casing or trunk is provided at one end with a wiper-roll 19, having strips of suitable material to wipe or brush adhering lint-cotton from the foraminous belt and cause the cotton to pass between the wiper-roll and a plain-surfaced pressing-roll 20, journaled above the wiper-roll and driven by a belt 21, Fig. 2, engaging the pulley 22, Fig. 2, on the shaft of the drum 2, Fig. 1, at the end of the casing where the wiper-roll 19 is journaled. The belt 21 engages the periphery of a grooved pulley 23 on the shaft of the roll 20, Fig. 3, and passes over a pulley 24, Fig. 2, on one end of a shaft 25, Fig. 1, the opposite end of which is provided with a pulley 26, Fig. 1, connected by a belt 27, Figs. 1 and 2, with a pulley 28 on the wiper-roll 19, all substantially as in the application hereinbefore mentioned.

The connections above referred to serve to impart rotary motion to the rolls 19 and 20, so that the compressed cotton-bat issuing from between these rolls can be delivered to a cotton baling or pressing mechanism.

The devices for rotating the rolls 19 and 20 can be variously modified, and therefore I do not wish to be understood as confining myself to the devices illustrated in the drawings.

The adjustability of one of the drums 2 enables the foraminous endless belt to be maintained in a stretched condition and thus causes it to perfectly operate in the operation of the apparatus.

The endless belt constitutes a conveyer by which the lint-cotton deposited thereupon in greater or less quantity is conveyed to the wiper-roll 19, Fig. 1, and pressing-roll 20, Fig. 3, for delivery to a cotton baling or pressing mechanism.

In the operation of the improved condenser and lint-cotton conveyer the lint-cotton is discharged from the battery or batteries of gins into the upper portion of the casing or trunk and is deposited on the foraminous belt. A large volume of air is necessarily delivered into the casing or trunk by the gins; but this air is constantly withdrawn by the exhaust apparatuses or fans 9, Fig. 1, which create suction in the lower portion of the casing or trunk and cause the air to flow through the foraminous cylinders or drums 14 into the descending air flues or trunks 16 and thence to the interior of the casing or trunk to the exhaust apparatuses or fans. The comparatively thick mass of cotton constantly lying upon the foraminous belt prevents the air from passing freely downward to the air-exhaust apparatuses or fans, and consequently the air pursues the course specified.

During the time the bale is being removed from the baling mechanism the passage of the cotton-bat from the storage-condenser should be stopped, and this is effected by temporarily stopping the traveling motion of the endless conveyer-belt 5. While the conveyer-belt remains stationary the cotton from the gins is continuously deposited on the conveyer-belt and accumulates thereupon to a greater or less depth; but the air introduced into the casing from the gins is constantly withdrawn by the exhaust apparatuses or fans 9, and the foraminous cylinder or drums are rotated at a high speed. The rapidity of rotary motion of the cylinders or drums causes the cotton which would otherwise accumulate on the cylinders or drums to be constantly thrown off by centrifugal force, and therefore the cylinders or drums maintain themselves free from accumulation of cotton without the employment of rotary brushes or other devices for this purpose. When the foraminous conveyer-belt is again started, the mass of cotton thereupon rises to a considerable height above the level of the lower edge of the partition 13, but is thrown back and equalized by a picker 31, Fig. 1, which levels off the surface and only permits a definite quantity to pass beneath the lower edge of the partition, so that the cotton is advanced toward the roll 20 at an approximately uniform depth. As the cotton passes beneath the lower edge of the partition 13, or as it is in transit toward the roll 20 after passing by the partition 13, the cotton is subjected to the action of a second rotary picker 29, which operates to agitate and clean the cotton and distribute it uniformly upon the conveyer-belt.

Between the end of the large conveyer-belt and the rollers of the press is a canvas belt 32, Fig. 1, from four to eight feet long, running on light rollers 33, Fig. 1. The surface of this belt is perfectly smooth, and it receives the bat from the conveyer 5 over the wiper 19, Fig. 1, and conveys and delivers it to the press. The smooth surface of the belt 32 obviates any retardation in the delivery of the bat to the press that might occur if delivered direct from the conveyer 5.

The improved construction and arrangement of parts avoid the use of ascending air-escape flues, in the lower ends of which the foraminous cylinders or drums are journaled, as in the application before referred to, and at the same time ample provision is made for continuously withdrawing the air from the casing, which is delivered thereinto by the cotton-gins.

The casing or trunk may be of any length desired, and the number of foraminous cylinders or drums can be increased to any suitable extent.

By dispensing with the ascending air-flues and the rotary brushes for cleaning the foraminous cylinders or drums I materially simplify the apparatus, and by providing the picker, the partition, and the descending air flues or trunks for carrying the air downward from the cylinders or drums into the lower portion of the casing I render the apparatus more efficient and satisfactory in practicable operation, and also make it more compact and less expensive and difficult of erection in the plant.

Having thus described my invention, what I claim is—

1. In an apparatus for condensing and delivering lint-cotton to a baling or pressing mechanism, the combination with a casing having lint-cotton inlets, a conveyer arranged within the casing, and foraminous drums or cylinders rotatable within the casing, of descending air-flues communicating with the ends of the cylinders and with the interior of the lower portion of the casing, and means for withdrawing air from the casing, substantially as described.

2. In an apparatus for condensing and delivering lint-cotton to a baling or pressing mechanism, the combination with a casing having lint-cotton inlets, a conveyer arranged within the casing, and foraminous drums or cylinders rotatable within the casing, of descending air-flues having their upper ends in communication with the ends of the cylinders and their lower ends in communication with the interior of the lower portion of the casing, and air-exhausting apparatus connected with the lower portion of the casing for withdrawing air from the casing at a point below the conveyer, substantially as described.

3. In an apparatus for condensing and delivering lint-cotton to a baling or pressing mechanism, the combination with a casing having lint-cotton inlets, an endless foraminous conveyer-belt traveling within the casing, and foraminous cylinders or drums journaled in the casing above the said belt, of descending air-flues located outside the casing and communicating at their upper ends with the ends of the cylinders or drums and at their lower ends with the interior of the lower portion of the casing, and air-exhausting apparatus connected with the casing at a point below the conveyer-belt, substantially as described.

4. In an apparatus for condensing and delivering lint-cotton to a baling or pressing mechanism, the combination with a casing having lint-cotton inlets, and a suitable conveyer arranged within the casing, of rapidly-rotatable foraminous cylinders or drums arranged in the casing above the conveyer and maintained by centrifugal force free from the accumulation of lint-cotton thereupon, and air-exhausting apparatus connected with the lower portion of the casing for withdrawing air therefrom, substantially as described.

5. In an apparatus for condensing and delivering lint-cotton to a baling or pressing mechanism, the combination with a casing having lint-cotton inlets, and a suitable conveyer arranged within the casing, of rapidly-rotatable drums or cylinders arranged in the casing above the conveyer and maintained by centrifugal force free from accumulation of lint-cotton thereupon, descending air-flues communicating with the ends of the foraminous cylinders and with the interior of the lower portion of the casing, and means for withdrawing air from the lower portion of the casing, substantially as described.

6. In an apparatus for condensing and delivering lint-cotton to be baled or compressed, the combination of a casing or trunk having lint-cotton inlets, a traveling conveyer-belt located within the casing, a partition located vertically within the casing and terminating at its lower end in proximity to the belt for leveling the mass of cotton accumulated on the belt in rear of the partition during the time the belt is motionless, a pressing-roller and a wiper-roller journaled at one end of the casing and between which the cotton-bat delivered by the conveyer-belt is compressed, and a rotary picker located between the said partition and the said pressing and wiper rollers for agitating, cleaning, and distributing the cotton over the belt after it passes under the partition toward the pressing and wiper rollers, substantially as described.

7. In an apparatus for condensing and delivering lint-cotton to be baled or compressed, the combination of a casing having lint-cotton inlets, an endless, traveling, foraminous belt arranged within the casing, foraminous cylinders or drums rotatable within the casing and located above the belt, a pressing-roller and wiper-roller journaled in one end of the casing and between which the cotton-bat delivered by the foraminous belt is compressed, a partition located at a point between the said foraminous cylinders or drums and the said pressing and wiper rollers and having its lower end terminating in proximity to the said belt for leveling the mass of cotton accumulated on the belt beneath the cylinders or drums during the time the belt remains motionless, and a rotary picker journaled in the casing between the partition and the pressing and wiper rollers, substantially as described.

8. In an apparatus for condensing and delivering lint-cotton to a baling or pressing mechanism, the combination with a casing having lint-cotton inlets, and a traveling foraminous belt arranged within the casing, of a partition located in the casing and having its lower end terminating in proximity to the belt, and rotary pickers located, respectively, in front and rear of the partition, one of which levels off the surface of the cotton, and the other one of which agitates and cleans the cotton and distributes it uniformly on the belt, substantially as and for the purposes described.

9. In an apparatus for condensing and delivering lint-cotton to a baling or pressing mechanism, the combination with a casing having lint-cotton inlets, and a traveling foraminous belt arranged within the casing, of foraminous cylinders or drums rotatable in the casing above the belt, descending air-flues communicating with the ends of the cylinders and with the interior of the lower portion of the casing, a partition arranged in the casing and having its lower end terminating in proximity to the belt, and rotary pickers located, respectively, in front and rear of the partition, substantially as and for the purposes described.

10. In an apparatus for condensing and delivering lint-cotton to a baling or pressing mechanism, the combination of a casing having lint-cotton inlets, a conveyer arranged within the casing, foraminous cylinders or drums rotatable within the casing, descending air-flues communicating with the ends of the cylinders and with the interior of the lower portion of the casing, means for withdrawing air from the casing, a pressing-roller and a wiper-roller between which the cotton-bat is delivered by the conveyer, and an endless belt which receives the cotton from the pressing and wiper rollers and serves to deliver the same to a baling or pressing mechanism, substantially as and for the purposes described.

In testimony whereof I have hereunto set my hand in presence of two subscribing witnesses.

WARREN A. PATTERSON.

Witnesses:
ALBERT H. NORRIS,
OTTO E. BRAITMAYER.